Feb. 8, 1938.  E. K. BENEDEK  2,107,883
HYDRAULIC WEIGHING SCALE
Filed Feb. 7, 1936   4 Sheets-Sheet 1

Inventor
ELEK K. BENEDEK
By
his Attorney.

Feb. 8, 1938.  E. K. BENEDEK  2,107,883
HYDRAULIC WEIGHING SCALE
Filed Feb. 7, 1936  4 Sheets-Sheet 2

Inventor
ELEK K. BENEDEK
By
его Attorney

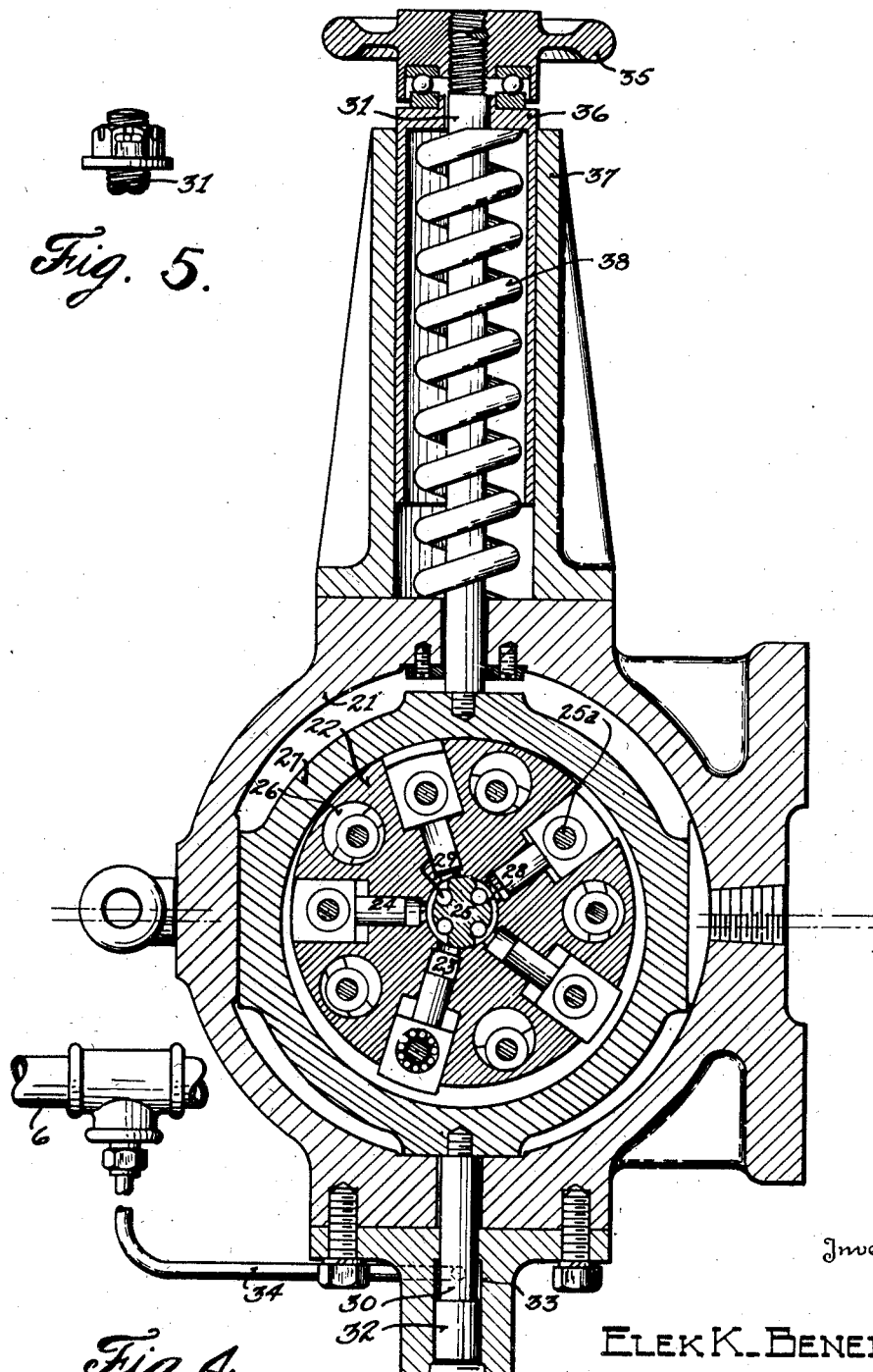

Feb. 8, 1938.  E. K. BENEDEK  2,107,883
HYDRAULIC WEIGHING SCALE
Filed Feb. 7, 1936  4 Sheets-Sheet 4

Inventor
ELEK K. BENEDEK
By J. Harrow Leonard
his Attorney

Patented Feb. 8, 1938

2,107,883

UNITED STATES PATENT OFFICE 2,107,883

HYDRAULIC WEIGHING SCALE

Elek K. Benedek, Bucyrus, Ohio

Application February 7, 1936, Serial No. 62,826

11 Claims. (Cl. 265—47)

This invention relates to fluid pressure weighing scales, one of the principal objects being to provide a highly sensitive and accurate hydraulic or fluid pressure operated scale combined with a variable delivery, fluid supply mechanism which delivers fluid pressure at the required degree for balancing the particular load and thereafter maintains the balancing pressure constant, and with a fluid operated pressure gauge calibrated to read in weight of the load balanced by the fluid.

A correlative object is to control the fluid supply mechanism automatically in a manner such that the load is sustained without movement during the weighing operation, and only a sufficient volume of fluid is delivered during the weighing operation to replace the slip fluid escaping from the scale.

Other objects and advantages will become apparent from the following specification wherein reference is made to the drawings in which—

Fig. 4 is a sectional view of the pump of the hydraulic mechanism illustrated in Fig. 3;

Fig. 5 is a fragmentary view illustrating one manner of connecting the control wheel of the pump to the stroke adjusting means of the pump;

Figure 2:
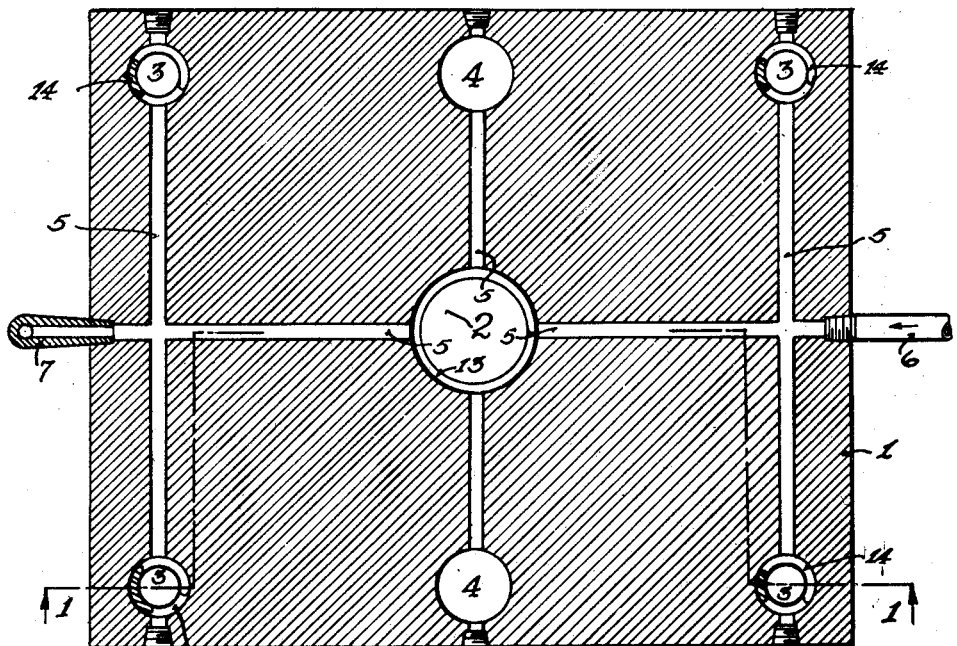
Fig. 2 is a horizontal sectional view of the apparatus illustrated in Fig. 1 and is taken on a plane indicated by the line 2—2 thereof.
Figure 1:
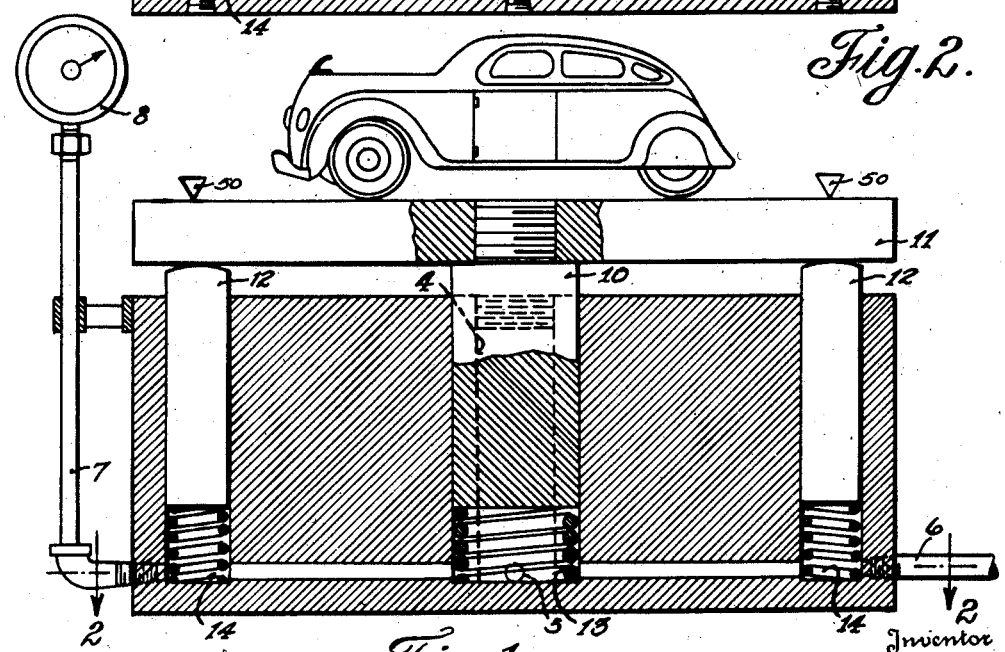
Fig. 1 illustrates a vertical sectional view of a scale block, platform, and connecting parts embodying the principles of the present invention and is taken on a plane indicated by the line 1—1 in Fig. 2.

For the purposes of illustration the scale will be described as a platform scale, the embodiment of the invention in the usual suspension scales being readily apparent therefrom.

Referring first to Figs. 1 to 6, inclusive, the scale comprises a cylinder block 1 having a main cylinder 2 and sets of auxiliary cylinders 3 and 4 respectively, all of the cylinders being interconnected through suitable ducts 5. Connected to one of the ducts 5 is a fluid supply pipe 6 which provides the connection between the cylinders and the fluid supply mechanism, later to be described. Also connected with the pipe 6 is a pipe 7 which leads to a fluid pressure operated gauge 8. The gauge 8, instead of being calibrated to designate the fluid pressure in pounds per square inch, is calibrated to designate directly the number of pounds weight of the load sustained by the scale. The gauge calibration may be so set that the unloaded scale shows a zero reading thereon when the weight of the platform and moving parts is supported solely by the fluid, or by springs, depending upon the fluid operating conditions.

Mounted in the cylinder 2 is a ram or piston 10 on the upper end of which is mounted the load supporting platform 11. Carried in the cylinders 3, respectively, are pistons 12 which are not directly connected to the platform but engage the under surface thereof for transmitting weight from the platform to the fluid. The pistons 12 are primarily to protect the main piston 10 from eccentric load in those instances in which live loads are rolled on to the platform from one end. The cylinders 4, on the other hand, are sealed at their upper ends and provide storage reservoirs for maintaining the cylinders 2 and 3 and the fluid conduits 5 completely filled with fluid at all times.

Compression springs 13 and 14, respectively, may be interposed between the pistons 10 and 12 and the bottom walls of their respective cylinders, if desired, and if provided, the springs should be of such strength that the weight of the moving parts of the scale, or dead load, is insufficient to fully compress them, a small remaining downward travel of the pistons in their cylinders being allowed for purposes of synchronization. The actual upward travel of the pistons is so slight that the dead load may be supported by the springs during the entire weighing operation. The springs may be dispensed with, however, and the pressure gauge calibrated to read zero when the dead load is supported by the fluid.

Figure 3:
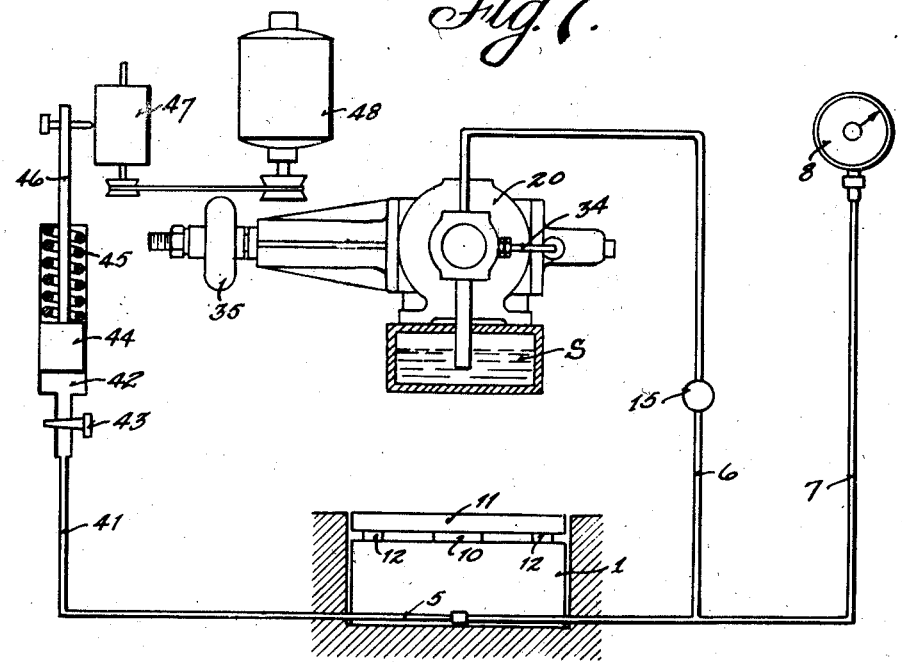
Fig. 3 is a diagrammatic illustration of the scale and hydraulic pumping mechanism showing the cooperative relation therebetween.
Figure 6:
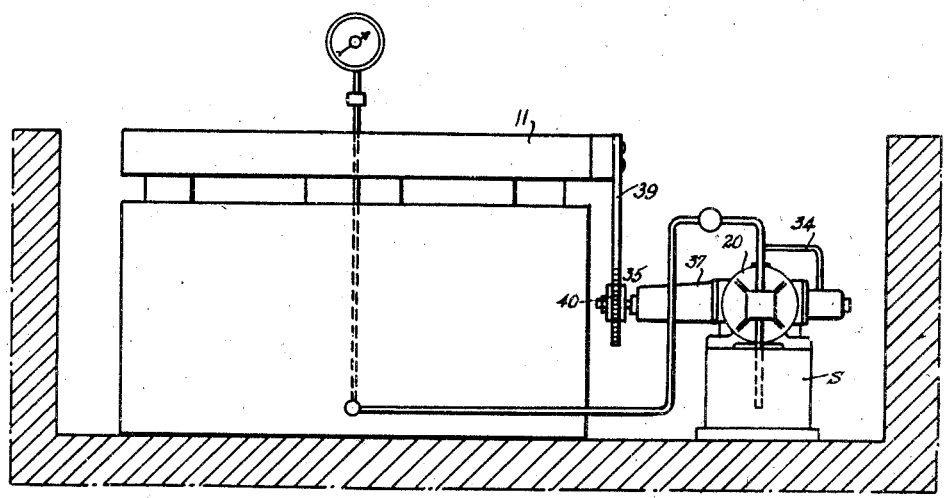
Fig. 6 is a diagrammatic illustration of one manner of synchronizing the pump stroke control and vertical position of the scale platform.

Referring next to Fig. 3, in the pipe 6 which leads to the pumping mechanism is a throttling valve 15 which retards the discharge of fluid from the scale cylinders so that when a load is initially applied on the scale, the platform will not lower appreciably but will be sustained by the fluid, while at the same time, the change in fluid pressure will be reflected at the pumping mechanism promptly. If desired, the valve 15 may be a check valve. Beyond the valve 15, the pipe 6 is connected to the delivery side of a one way variable delivery pump 20 having a stroke controlling mechanism responsive to pressures in the pipe 6.

The pump 20, better illustrated in Fig. 4, is preferably of the rotary, radial piston type, comprising a body 21 and a rotary barrel 22 having a plurality of radial cylinders 23 in each of which is a piston 24. The cylinders are in valving cooperation with a suitable valve pintle 25 which is received in an axial bore of the barrel. The pistons 24 are actuated, consequent upon rotatably driving the barrel, by rotatable reactance rings 26 cooperating with crosspins 25a carried in the head portions of the pistons. The reactance rings, in turn, are rotatably supported in an adjustable stator 27 which is mounted so that it can be shifted to different positions wherein its axis is coincident with or parallel to and offset from the axis of rotation of the barrel for adjusting the stroke and consequently the delivery of the pump.

Referring again to Fig. 3, the pipe 6 is connected to the main discharge port of the pump, the main suction port thereof being in communication with a suitable sump S. The fluid circuit is completed by the internal suction ducts 28 and internal pressure ducts 29 in the valve pintle 25, suitable valve ports for cooperating the ducts 28 and 29 with the cylinders 23 being provided in the pintle.

The stroke or delivery of the pump is adjustable and the adjusting mechanism adjusts the pump automatically so that at the weighing pressure, only sufficient fluid is pumped to replace the slip fluid.

For shifting the stator 27 to vary the stroke and delivery of the pump, the stator is provided with diametrically oppositely extending control rods 30 and 31. Carried on the rod 30 is a piston 32 operating in a cylinder 33. Connected with the cylinder 33 is a fluid feed pipe 34 which connects with the cylinder 33 at the right hand end of the piston 32. Fluid pressure in the line 34 and pipe 6 urges the piston 32 downwardly in Fig. 4, thus increasing the stroke of the pump in proportion to the fluid pressure and thereby, in proportion to the live load.

The opposite control rod 31 is provided with a resisting means which yieldably urges the stator to minimum stroke position. The resisting means includes a hand wheel 35 which is arranged to be screwed to different positions along the rod 31. The wheel 35 abuts the outer end of a sleeve 36 surrounding the rod 31, so as to move the sleeve 36 to different positions inwardly axially relative to the rod 31. The sleeve, in turn, is slidably mounted in a suitable guide 37 carried on the body 21. Operatively interposed between the sleeve 36 and body 21 is a coiled compression spring 38 which normally urges the sleeve 36 outwardly of the body or to the right and, through the medium of the sleeve and hand wheel 35, urges the rod 31 and stator 27 upwardly in Fig. 4, or in a direction opposite to that in which it is urged by the rod 30 and piston 32. Consequently, by adjusting the hand wheel 35 on the rod 31, a predetermined compression of the spring 38 may be obtained and the resistance to movement of the stator 27 toward maximum stroke position may be varied.

The pistons 24 of the pump also urge the stator 27 toward zero stroke position and the piston 32 must be of proper size to resist both the pump piston load reactance and the spring. In some instances it is possible to dispense with the spring 38, depending on proper relation between the piston 32 and reactance thrust of the pistons 24 for proper balanced relation, but such a structure is comparatively fixed in that no compensation can be made in the relation when changes occur in the viscosity of the fluid or wear of the pump changes its delivery-stroke ratio.

It has been found that the slip characteristics of a particular scale vary in a direct proportional relationship to the fluid pressure in the scale cylinder but are constant for each given fluid pressure in the particular scale. During the weighing operation, since the live load is constant, the slip for that particular load will be constant. Assuming, therefore, that the scale is to be placed in a roadway so as to weigh certain loads successively driven onto the platform, the platform is maintained by the pumped fluid in a raised position level with the roadway, the minimum stroke of the pump being just sufficient to replace slip fluid occurring under dead load. Stops 50, later to be described, may be provided, however, so as to assure that the platform will not be raised above a given maximum level in event of any slight discrepancy in the delivery of the pump. When the platform is in this position, the spring 38 has expanded and moved the stator to minimum stroke and only enough fluid is supplied to replace the dead load slip.

When the live load is driven onto the platform, the fluid pressure is thereby increased suddenly with a resultant increase in slip. This fluid pressure is transmitted through the throttling valve 15 so as not to subject the piston 32 to sudden full impact pressures but to subject it to the full live load pressure. Thus, substantially simultaneously with the increase in slip, the piston 32 is moved downwardly in Fig. 4 by the fluid pressure, overcoming the spring 38 to a higher degree and increasing the stroke of the pump. The spring pressure and piston 32 are so related that the stroke of the pump is varied in direct proportion to the fluid pressure in the scale cylinder throughout the general operating range of the scale.

If a greater range of loads is required, the spring may be adjusted by the hand wheel. Thus for extremely heavy loads, the spring may be relieved by the hand wheel so that a greater proportion of the maximum pump stroke is provided for the greater load. Again, by adjusting the compression of the spring, fluctuations that might otherwise occur in the delivery-clip ratio, due to changes in temperature, and the like, may be compensated.

If desired, the hand wheel may be so associated with the platform that the slight travel of the scale platform when the load is first applied will effect the proper change in the setting of the spring. For this purpose, the structure illustrated in Fig. 6 may be used, wherein the platform 11 and hand wheel are connected for operating the hand wheel thereby. A suitable connection may comprise a rack 39 carried by the platform. The hand wheel 35 may be provided with a toothed pinion portion, indicated at 40 in Fig. 6, the teeth of which cooperate with the rack so that the wheel 35 may be rotated to vary the compression of the spring 38 in accordance with the vertical travel of the platform. The rack and pinion connection, in the illustrative example, is arranged to decrease the compression of the spring as the platform lowers and to increase the compression as the platform rises. As a result, if the load is extremely heavy, the spring will be partially relieved automatically to increase the ratio of delivery to slip until the platform again reaches the weighing level. At this latter position, the platform will have operated the hand wheel so that the initial setting of the spring 38 and the balance between slip and delivery is restored. If the platform should tend to rise beyond its weighing level, the spring 38 would be sufficiently compressed to overcome the piston 32 and set the pump to zero stroke so as to arrest movement of the platform. In event of breakage in the fluid circuit, the spring 38 restores the pump to zero position.

In some instances it is desirable to provide means for recording the weight of the load, in which instance the ducts 5 may be connected through a suitable pipe 41 with a cylinder 42, a stop cock 43 being provided between the cylinder and pipe 41 for cutting off the recording mechanism when desired. A piston 44 operates in the cylinder 42 against a spring 45 of predetermined resistance, the resistance of the spring 45 being calibrated for the range of loads to be weighed on the scale. The piston carries a marker 46 which operates on a suitable paper chart carried on a revolving cylinder 47 which is driven by a motor 48. Thus as the piston 44 reciprocates due to changes in the fluid pressure in the pipe 41, the amount of movement is recorded on the chart carried on the cylinder 47, the chart being calibrated in weight units.

It is apparent that by the use of the present structure, any fluid escaping from the scale by way of slip and otherwise is readily and automatically replaced. Consequently the pistons and cylinders do not have to fit with as close clearance as would otherwise be necessary were the loss of fluid by slip such as to effect operation and accuracy of the scale. As a result of the greater working clearances, frictional resistance and wear are greatly reduced.

The scale block 1 and all operating parts may be made of a high grade alloy steel such as NITRALLOY so that there will be practically no wear of the working surfaces.

The pump may be driven by any suitable source of power, preferably an electrical motor, not shown, for applying fluid to raise the platform and support the load. The electrical switch of the motor is preferably arranged to be closed upon movement of the load onto the platform, whereupon the fluid is pumped to the cylinders, 2, 3, and 4 by the pump 20.

The pump will continue operating until the pressure built up in the cylinders is sufficient to sustain the loaded platform in fixed elevated position and balanced condition, the pump automatically thereafter supplying only sufficient pressure fluid to replace the slip. Thus a point of synchronization is reached and automatic self-adjustment is provided. Obviously, the driving relation between the pump adjusting wheel pinion 40 and the platform may be such that a certain platform motion will give a certain definite change in pump stroke.

If in any case a very large pump of the usual construction were used, it would be necessary that the pump operate substantially at all times with very short stroke. To obtain efficiency, however, instead of the usual pump, a pump having a 50% smaller stroke diameter ratio than a conventional pump is used herein so that it may operate more efficiently at short stroke and supply the required pressure at the required volume.

Figure 7:
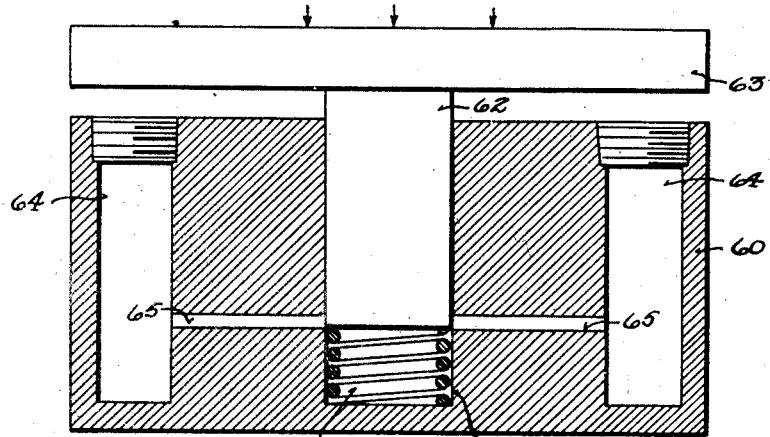
Fig. 7 is a sectional view, similar to Fig. 1, illustrating a modification of the invention.

In some instances in which light loads are to be weighed and slip accordingly is relatively less important, the scale illustrated in Fig. 7 may be utilized. This scale comprises a block 60 having a main cylinder 61 in which operates a plunger 62 having at its upper end a platform 63. In addition to the operating cylinder 61, the block has a plurality of storage cylinders 64, similar to the cylinders 4, which are connected with the cylinder 61 by suitable ducts 65. The piston 62 is urged outwardly to its normal unloaded position by a coil compression spring 66 of constant characteristics, in the cylinder 61, this spring being sufficient to balance only the weight of the piston and platform. Even in such a pump there will be a slight loss of liquid over a period of time. However, the ducts 65 are so arranged as to communicate with the cylinder 61 when the piston 62 is in its raised or unloaded position but are closed by the piston when the piston is in weighing position so that all of the piston pressure except that supported by the spring 66 is transmitted to the fluid in the cylinder 61 and none to that in the cylinders 64. The fluid in the cylinder 61 is communicated with a fluid operated gauge in the same manner as the structure heretofore described. Thus any slip fluid lost around the piston when loaded is replaced through the ducts 65 when the piston is again brought to its raised position by the spring 66. An occasional filling of the cylinders 64, which need be only after very long periods of operation, assures the maintenance of operating fluid at all times within the cylinder 61. Any excess of oil in the cylinder 61 is forced out through the ducts 65 back through the cylinders 64 as the piston descends until the piston passes beyond the ends of the ducts 65, whereupon all pressure of the pistons is exerted on the fluid which is trapped within the cylinder 61. A very small air vent may be provided in each of the cylinders 64, at the top thereof, to assure feeding of oil into the cylinder 61.

Having thus described my invention:—

I claim:

1. The combination with a fluid pressure scale including a fluid cylinder having fluid therein, a load sustaining piston reciprocable therein and supported by the fluid, and a fluid pressure operated gauge operatively connected with the cylinder, of variable delivery rotary pump means and continuously driven during the weighing operation and operative to pump into the cylinder, continuously during the weighing operation, replacement fluid equal in volume to the slip fluid and at the fluid pressure in the cylinder under changing load conditions, and including means operated by the fluid pressure in the cylinder to adjust the stroke of the pump means.

2. The combination with a fluid pressure scale including a fluid cylinder having fluid therein, a load sustaining piston reciprocable therein and supported by the fluid, and a fluid pressure operated gauge operatively connected with the cylinder, of variable delivery pump means operative to replace continuously in the cylinder an amount of fluid equal to the volume of slip fluid from the piston and cylinder at the pressure of the fluid in the cylinder, and means to adjust the pump means for controlling the volume of replacement fluid in response to relative travel of the piston and cylinder.

3. The combination with a fluid pressure scale including a fluid cylinder having fluid therein, a load sustaining piston reciprocable therein and supported by the fluid, and a fluid pressure operated gauge operatively connected with the cylinder, of a variable stroke pump operative to replace continuously in the cylinder an amount of fluid equal to the volume of slip fluid from the piston and cylinder at the pressure of the fluid in the cylinder, and means responsive to the pressure of the fluid in the cylinder for adjusting the pump stroke when the volume and pressure of replacement fluid equals the volume and pressure of the slip fluid and fluid pressure in the cylinder respectively to a degree to maintain the fluid pressure and replacement constant indefinitely, whereby the load being weighed is supported in fixed position.

4. A scale comprising a contractable fluid chamber having fluid therein, a supporting means operatively connected to the chamber for supporting a load to be weighed and applying the load to urge the chamber to contracted condition, a fluid pressure operated gauge connected to the chamber, a variable delivery rotary fluid variable stroke pump connected to the chamber for supplying fluid thereto during the weighing operation, and continuously driven during the weighing operation, and means operated by fluid pressure in the cylinder to adjust the stroke of the pump.

5. A scale comprising a contractable fluid chamber having fluid therein, a supporting means operatively connected to the chamber for supporting a load to be weighed and applying the load to urge the chamber to contracted condition, a fluid pressure operated gauge connected to the chamber, a variable delivery fluid pump connected to the chamber for supplying fluid thereto during the weighing operation for sustaining the load by fluid pressure, and means for adjusting the pump delivery to maintain a balance between the volume of fluid supplied by the pump and the slip volume of fluid escaping from the scale.

6. A scale comprising a load supporting means for supporting a load to be weighed, a hydraulic mechanism operatively connected to the supporting means and containing fluid subjected to pressure of the load pressure on the supporting means for sustaining the load, a fluid pressure gauge connected to the mechanism and responsive to changes in the fluid pressure therein, a variable delivery fluid pump connected to said mechanism for supplying fluid thereto, under pressure, during the weighing operation, and means for balancing the fluid pressure delivered by the pump and the fluid pressure resulting from the load.

7. A scale comprising a load supporting means for supporting a load to be weighed, a hydraulic mechanism operatively connected to the supporting means and containing fluid subjected to the weight of the load on the supporting means and sustaining the load, a fluid pressure gauge connected to the mechanism and responsive to changes in the fluid pressure therein, a variable stroke fluid pump connected to said mechanism for supplying fluid thereto, under pressure, during the weighing operation, means for balancing the fluid delivery of the pump and the slip fluid escaping from the scale and including fluid pressure operated means for urging the pump toward full stroke position and resilient means in opposition thereto urging the pump toward zero stroke position, said resilient means being operative for automatically unloading the pump when the load is removed from the scale.

8. A scale comprising a load supporting means for supporting a load to be weighed, a hydraulic mechanism operatively connected to the means and containing fluid subjected to the load pressure on the means, a fluid pressure gauge connected to the mechanism and responsive to changes in the fluid pressure therein, a variable delivery pump connected to the mechanism for supplying fluid, under pressure, thereto, a delivery control means for the pump, and means operated by the fluid pressure of the said mechanism for moving the control means toward maximum delivery position, in a proportional relationship to the fluid pressure, whereby said pump may be operated to sustain the load immovably in supported condition by the fluid pressure.

9. A scale comprising a load supporting means for supporting a load to be weighed, a hydraulic mechanism operatively connected to the means and containing fluid subjected to the pressure of the load on the said means, a fluid pressure gauge connected to the mechanism and responsive to changes in the fluid pressure therein, a variable delivery pump connected to the mechanism for supplying fluid under pressure thereto, a variable stroke control means for the pump, responsive to the fluid pressure for increasing the pump delivery in a direct proportional relationship to the load, and means for adjusting the said proportional relationship.

10. A scale comprising a load supporting means for supporting a load to be weighed, a hydraulic mechanism operatively connected to the means and containing fluid subjected to the load pressure on the means, a fluid pressure gauge connected to the mechanism and responsive to changes in the fluid pressure therein, a variable delivery pump connected to the mechanism for supplying fluid under pressure thereto, a delivery control thereon, resistance means yieldably urging the control to minimum delivery position, means operated by the fluid pressure for urging the control toward maximum delivery position against the resistance means, whereby said pump may be operated to move the loaded load supporting means by fluid pressure a predetermined amount and sustain the load fixed in the moved position, and means operated by the load supporting means to vary the resistance of the resistance means in response to travel of the load supporting means.

11. A scale comprising a load supporting means for supporting a load to be weighed, a hydraulic mechanism operatively connected to the means and containing fluid subjected to the load pressure on the means, a fluid pressure gauge connected to the mechanism and responsive to changes in the fluid pressure therein, a variable delivery fluid pump connected to the mechanism, a delivery control mechanism for the pump, resisting means yieldably urging said control toward one limit of delivery and yieldably resisting movement thereof toward the opposite limit, means responsive to the fluid pressure for urging said control to one of said limits against the resistance of the resisting means, and means to adjust the resistance of said resisting means.

ELEK K. BENEDEK.